UNITED STATES PATENT OFFICE.

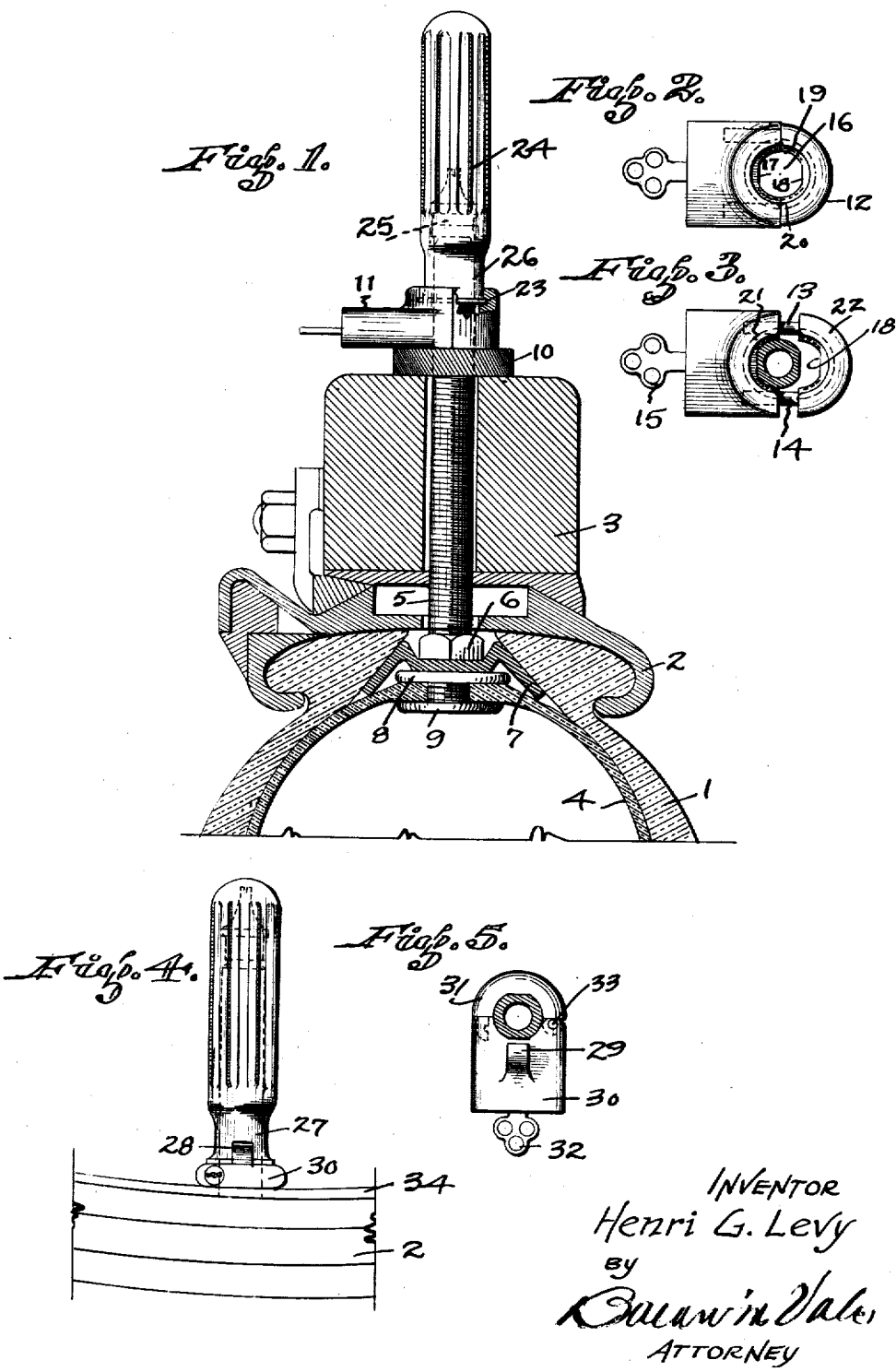

HENRI G. LEVY, OF SAN FRANCISCO, CALIFORNIA.

TIRE-LOCK.

1,370,977.    Specification of Letters Patent.    Patented Mar. 8, 1921.

Application filed January 24, 1918. Serial No. 213,619.

*To all whom it may concern:*

Be it known that I, HENRI G. LEVY, a citizen of the United States, and a resident of the city and county of San Francisco, State of California, have made a new and useful invention—to wit, Improvement in Tire-Locks; and I do hereby declare the following to be a full, clear, concise, and exact description of the same.

The invention relates particularly to means for locking vehicle tires onto vehicle wheels or onto tire racks or other mountings.

Among the objects of the invention are to prevent the theft, particularly of pneumatic tires, from automobile wheels or from their carrying racks, and to provide such a lock as will be adaptable to the present construction and arrangement of pneumatic tires on permanent or demountable rims, to prevent the theft thereof from the vehicle wheels or the spare tires carried on suitable carriers.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatever form it may be embodied.

In the accompanying one sheet of drawings:

Figure 1 is a side elevation, partly in cross section, of a tire lock constructed in accordance with this invention and applied to a vehicle wheel and tire shown in cross section.

Fig. 2 is a plan view from above of the valve stem engaging lock, in the closed position.

Fig. 3 is a similar view of the same showing the lock in the open position with the valve stem shown in cross section therein.

Fig. 4 is a front elevation of a modification of the locking means.

Fig. 5 is a plan view from above of the same, illustrating a pad lock having a spring bow engaging a tire valve shown in cross section.

In detail the construction illustrated in the drawings includes, referring to Fig. 1, the tire casing 1 mounted on the conventional rim 2 which is fixed, or demountably attached, to the felly 3, of the vehicle rim. The tire casing has the usual inner air tube 4, provided with the valve stem 5 fixed therein and extending through the rim 2 and the felly 3 through which it protrudes. This valve is threaded throughout its length to receive the jam nut 6, which holds the spreader 7 and the washer 8 and the wall of the inner tube 4, in compressed assembly against the head 9 of the valve stem. The running nut 10 provided with an internal compression washer (not shown), in the usual manner, is threaded on the valve stem and bears against the felly to cover the hole therethrough for the passing of the valve stem. Thus far the construction is conventional and is encountered with various modifications in this art.

The locking device as illustrated in Figs. 1, 2 and 3, comprises a lock 11, preferably of the pad lock type, having the bow 12 with the extensions 13 and 14 extending into the pad lock to be engaged by the locking bolt controlled by the removable key 15. The opening 16 between the interior of the bow and the end of the padlock is of a contour to fit snugly the perimeter of the valve stem which consists of a circle having flattened sides 17 and 18 to engage the flat side of the valve stem, extensions 19 and 20 of the circle being threaded to engage the thread on the valve stem to prevent the pad lock from being moved longitudinally on the valve stem. The lock 11 and the bow 12 are each provided with the semicircular lugs 21—22, which combined form a true circle having an annular groove therein to engage the annular flange 23 formed on the dust cap 24, which is in the form of a tubular thimble entirely inclosing the end of the valve stem 5. The valve stem is provided with an interior spring operated check valve (not shown) to hold the air pressure pumped into the inner tube 4. The end of the valve stem being reduced and threaded to receive the valve cap 25 provided with a gasket to seal the end of the valve stem, in the usual manner.

This invention operates substantially as follows: The padlock in the open position, as shown in Fig. 3, is inserted over the protruding end of the valve stem to a position at rest on top of the nut 10, the dust cap 24, the neck 26, which need not be threaded, clears the threads on the valve stem and is inserted over the ends of the valve stem inclosing the valve cap. The padlock is then closed to engage the flange 23 on the dust cap. The bow 12 automatically locking if it is what is known as a snap padlock or it is locked by the turning of the key which is then removed. Thus applied this lock securely locks the tire 1 on the felly 3 preventing its removal until the removal of the padlock 11, or by the breaking of the valve stem 5. The particular reason for locking the dust cap 24 in position is to prevent the deflation of the tire by the removal of the valve cap 25 and the unseating of the valve in which manner the air could be removed noiselessly and without causing suspicion. On the other hand, if the valve stem were broken off while the tire was inflated, the sudden rush of air from the valve would cause a whistling noise giving warning that the tire was being tampered with, which in itself would act as a deterrent to the ordinary petty larcenist. It is obvious that the application of this lock in no way interferes with the normal functioning of the parts to which it is attached.

In Figs. 4 and 5 is illustrated a modification of the lock, in which the reduced neck 27 is threaded to engage the thread on the valve stem 5, as is now common practice. The end of the dust cap is notched as at 28 to engage the lug 29 formed on the lock 30. This lock 30 is similar in every way to the lock 11 except that it is unnecessary to thread the bow 31 and the end of the lock as at 19 and 20 shown in Fig. 2, but the contour of the bow and the end of the padlock are made to snugly engage the perimeter of the valve stem. The lug 29 engaging the notch 28 prevents the unscrewing of the dust cap because of the non-rotatable engagement of the padlock with the valve stem. The bow 31 is locked by the removable key 32. The bow may be of the sliding type illustrated in Figs. 2 and 3, or may be pivoted as at 33, to swing out of engagement with the valve stem. The particular form of the lock is not germain to this invention and may be varied to suit circumstances or the taste of the producer.

In Fig. 4 the annulus 34 of the tire rack is indicated to show the application of the lock to tires carried on the rack, inflated ready for application to the vehicle wheel. The mode of operation of the lock in either instance is the same, except that the lock 30 lies against the annulus 34 instead of against the felly of the wheel or the nut 10.

Having thus described this invention, what I claim and desire to secure by Letters Patent is:

1. A lock applicable to the inflating valve of vehicle tires and engageable with the dust cap thereof, comprising two complemental members having semicircular portions to form a circular opening adapted to receive the valve below the dust cap thereof, said opening having at least one flattened surface to engage a corresponding surface on the valve, at least one of the members having means engageable with the lower portion of the dust cap to prevent an axial movement thereof relative to the valve, and a key controlled locking means for securing said members in and releasing them from effective locking position.

2. A lock applicable to the inflating valve of vehicle tires and engageable with the dust cap thereof to prevent the fraudulent removal of the tire from its mounting, comprising two complemental members having threaded circular portions adapted to form a circular opening to receive the valve below the dust cap thereof, said opening having at least one flattened surface to engage a corresponding surface on the valve, at least one of said members having a rigid detent engageable with the lower portion of the dust cap to prevent an axial movement thereof relative to the valve, and a key controlled locking means for securing said members in and releasing them from effective locking position.

In testimony whereof, I have hereunto set my hand at San Francisco, California, this 15th day of January, 1918.

HENRI G. LEVY.

In presence of—
LINCOLN V. JOHNSON,
A. J. HENRY.